United States Patent [19]

Pilz

[11] 3,940,167
[45] Feb. 24, 1976

[54] CONVERTIBLE TRAILER/RAIL CAR TRACTION UNIT

[75] Inventor: Gilbert B. Pilz, Toledo, Ohio

[73] Assignee: Young Ottawa, Inc., Bowling Green, Ohio

[22] Filed: Jan. 30, 1975

[21] Appl. No.: 545,390

[52] U.S. Cl. ...... 280/456 R; 280/405 A; 280/491 B; 105/26 R
[51] Int. Cl.² ............................................. B60D 1/00
[58] Field of Search ............ 280/456 R, 456 A, 472, 280/415 R, 415 A, 415 B, 405 A; 214/86 A, 491 B; 105/26 R

[56] References Cited
UNITED STATES PATENTS

| | | | |
|---|---|---|---|
| 3,118,688 | 1/1964 | Stilley | 280/456 R |
| 3,207,085 | 9/1965 | Burr | 105/26 R |
| 3,207,338 | 9/1965 | Felburn | 280/415 R X |
| 3,427,044 | 2/1969 | Lynch | 280/472 |
| 3,767,069 | 10/1973 | White | 214/86 A |

*Primary Examiner*—Leo Friaglia
*Assistant Examiner*—R. Schrecengost
*Attorney, Agent, or Firm*—Colton & Stone, Inc.

[57] ABSTRACT

A conventional over-the-road tractor is modified to include a rail car coupling assembly mounting a rail car coupler in tandem behind the conventional fifth wheel for selective movement into and out of the path of conventional trailer coupling movement to permit of selective coupling with a trailer or rail car.

When operating in the rail car coupling mode the conventional fifth wheel boom assembly is actuated to effect, via the rail car coupling assembly, a partial weight transfer from the rail car to the traction unit.

5 Claims, 6 Drawing Figures

CONVERTIBLE TRAILER/RAIL CAR TRACTION UNIT

BACKGROUND OF THE INVENTION

The more obvious advantages in the use of relatively light weight traction vehicles to perform the functions normally assigned to switching locomotives in railway shops, switching and rail yards are cost savings and, in the case of steerable rubber tired vehicles, maneuverability. Exemplary are the general recognitions contained in U.S. Pat. Nos. 3,198,137; 3,232,241; 3,380,397; 3,427,044 and 3,638,579. Notwithstanding the obvious savings to purchase and maintain such vehicles as compared with conventional switching locomotives, their special design parameters substantially limiting the same to the rail car environment coupled with a relatively low volume requirement yet impose the usual high cost factor of specially designed equipment as compared with the economics of mass production. One such special design parameter relates to achieving the required traction for rail car movement.

The purpose of the invention is to modify a conventional, mass produced over-the-road vehicle whereby the same may be selectively employed for conventional over-the-road or rail car movement.

SUMMARY OF THE INVENTION

A conventional trailer tractor having an elevatable fifth wheel is modified to include a rail car coupling assembly outboard of the fifth wheel. The rail car coupling assembly supports a rail car coupler for selective movement into and out of the path of trailer coupling movement undergone by the tractor during a conventional trailer coupling operation. When the rail car coupler is supported in the path of trailer coupling movement, the tractor may be coupled to a rail car outboard of the fifth wheel and, when positioned out of the path of trailer coupling movement, tractor-trailer coupling may be effected in the usual fashion without interference from the rail car coupler.

The rail car coupler assembly is positioned for actuating engagement by the conventional, power operated, fifth wheel supporting boom to effect a weight transfer from the rail car to the tractor driving axle thus obviating the requirement to provide auxiliary power equipment to effect weight transfer between vehicles such as, for example, in U.S. Pat. Nos. 323,283 and 3,767,069.

DESCRIPTION OF THE PREFERRED EMBODIMENT

Figure 1:
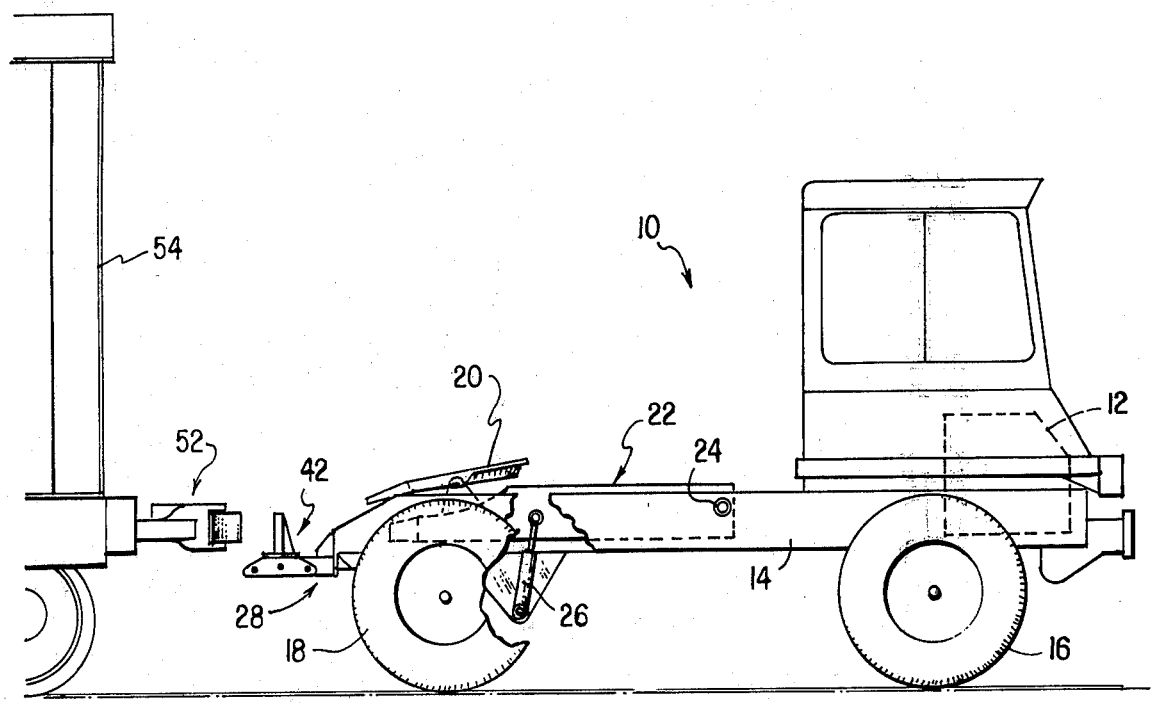
FIG. 1 is a broken, side elevational view of a convertible trailer/rail car traction unit in position to undergo coupling movement with a rail car.

In FIG. 1, is illustrated a conventional over-the-road vehicle 10 having a power plant 12, frame 14, front steerable wheels 16, rear drive wheels 18 and the usual fifth wheel 20 supported on boom assembly 22 for vertical adjustment about pivot axis 24 under the influence of double acting rams 26 during trailer coupling operations.

Figure 6:
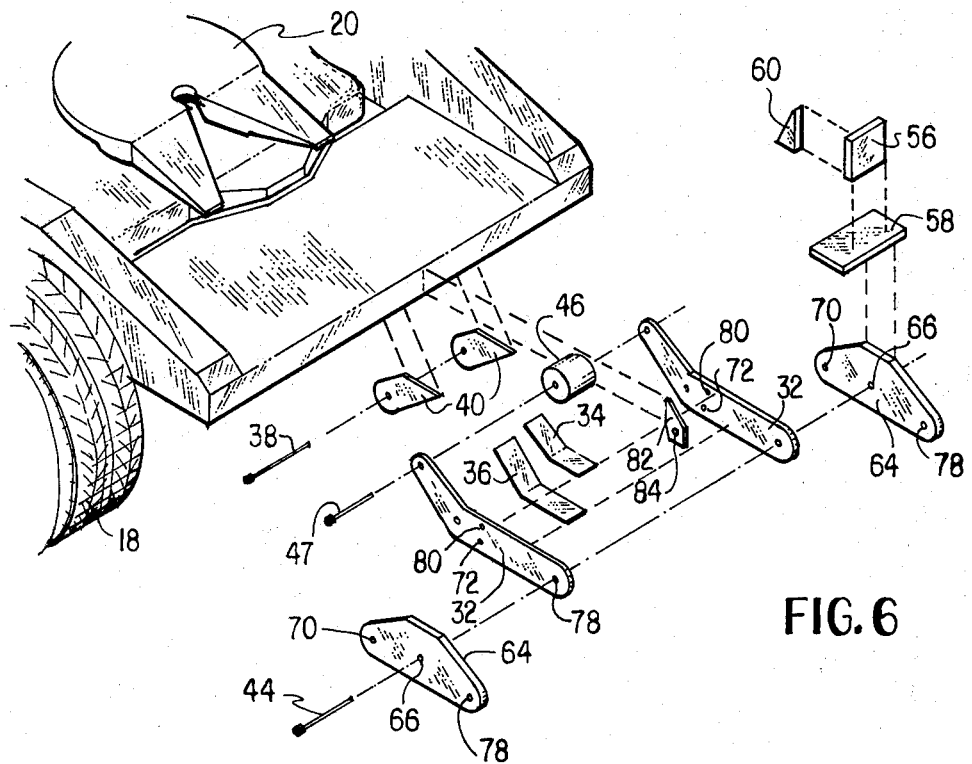
FIG. 6 is an exploded isometric view of the rail car coupling assembly.
Figure 2:
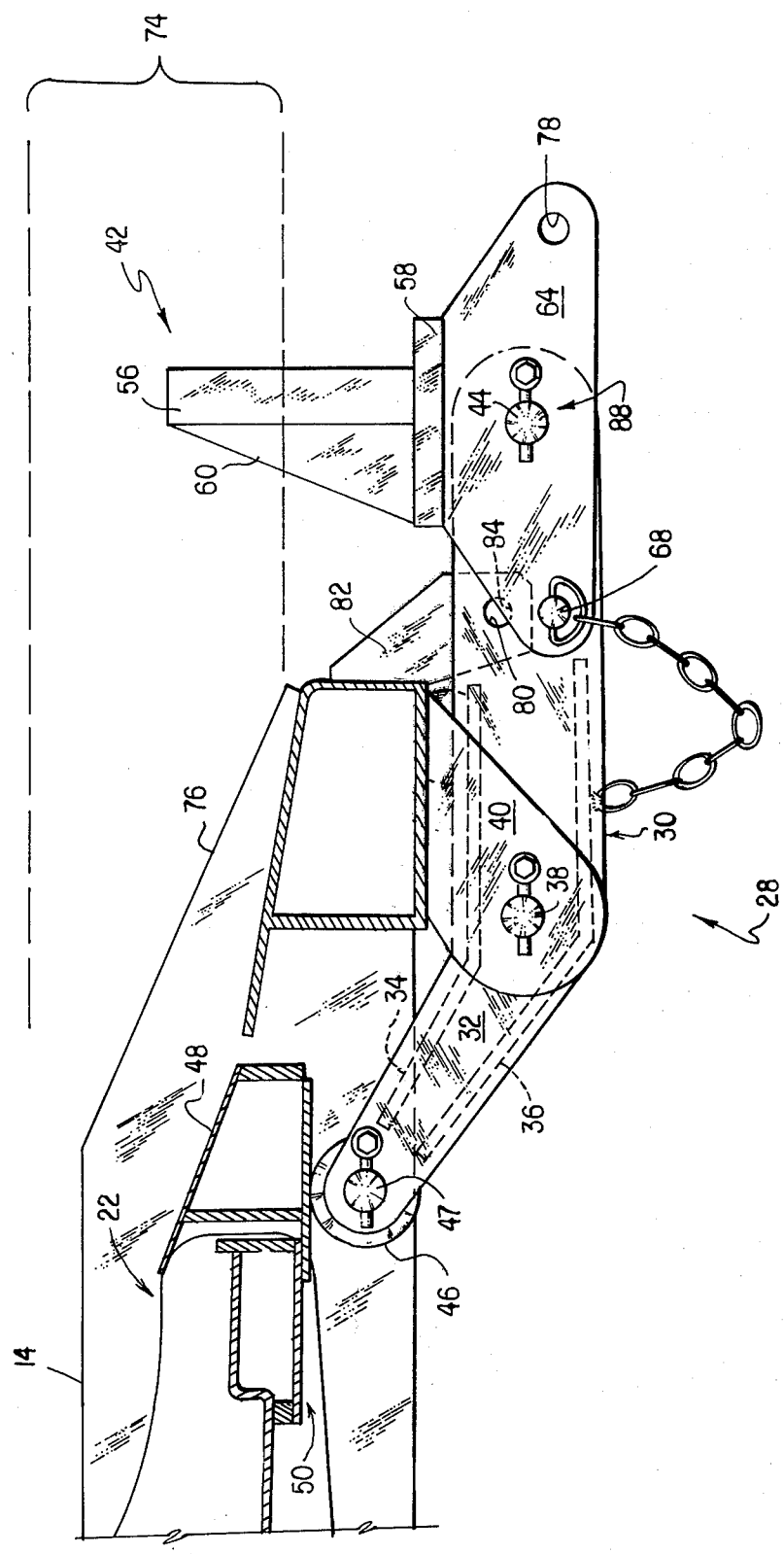
FIG. 2 is a partial longitudinal section of the coupling end of the traction unit illustrating the rail car coupling mode of FIG. 1.
Figure 3:
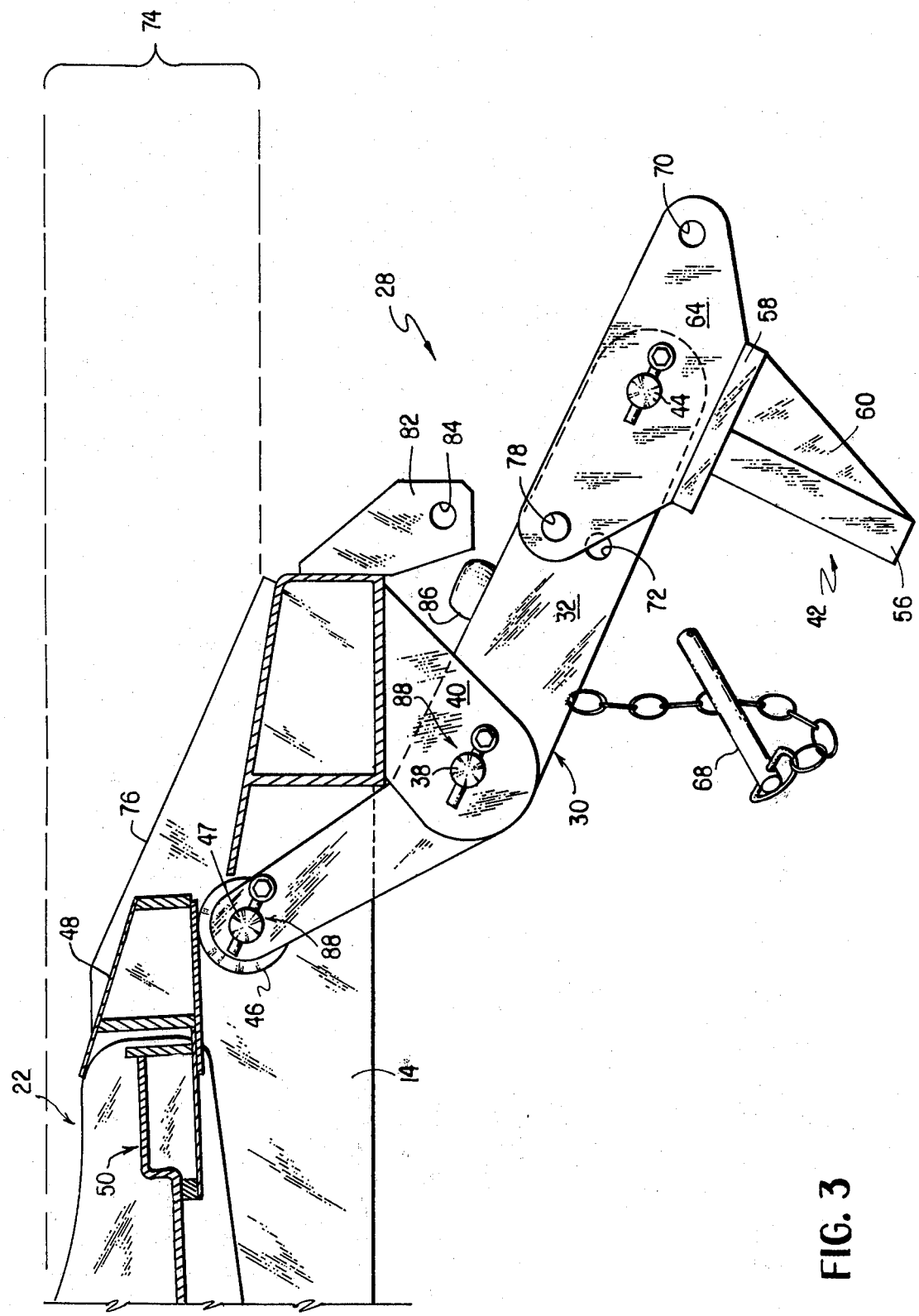
FIG. 3 is a similar section illustrating the trailer coupling mode.

The purpose of the present invention is to modify the aforedescribed vehicle, which may take the form of a spotter tractor of the type manufactured by the assignee of the present invention, to incorporate a rail car coupling capability and to this end the rail car coupling assembly 28, best shown in FIGS. 2, 3 and 6, is mounted on frame 14 outboard of fifth wheel 20.

Rail car coupling assembly 28 includes a box frame bell crank assembly 30 comprising spaced arms 32 integrated with top and bottom walls 34, 36 (FIGS. 2 and 6), as by welding or the like, fulcrummed on pivot pin 38 spanning frame brackets 40. A rail car coupler 42 is pivotally mounted on pin 44 at the outboard end of bell crank assembly 30 for pivotal adjusting movement between the positions of FIGS. 2 and 3 while the inboard end of the bell crank assembly mounts a heavy duty roller 46, on pin 47, in underlying relation to an integral outboard extension 48 of fifth wheel boom assembly 22 as illustrated in FIGS. 2 and 3. Boom assembly 22 includes suitable cross bracing 50 which may, if desired, constitute the boom assembly construction overlying roller 46 by appropriate modification of the bell crank configuration. In either event it will be apparent that retraction of rams 26, only one of which is shown in FIG. 1, results in clockwise rotation (as viewed in FIG. 3) of boom assembly 22 about axis 24 which translates into counterclockwise rotation of bell crank assembly 30 through roller 46.

Figure 4:
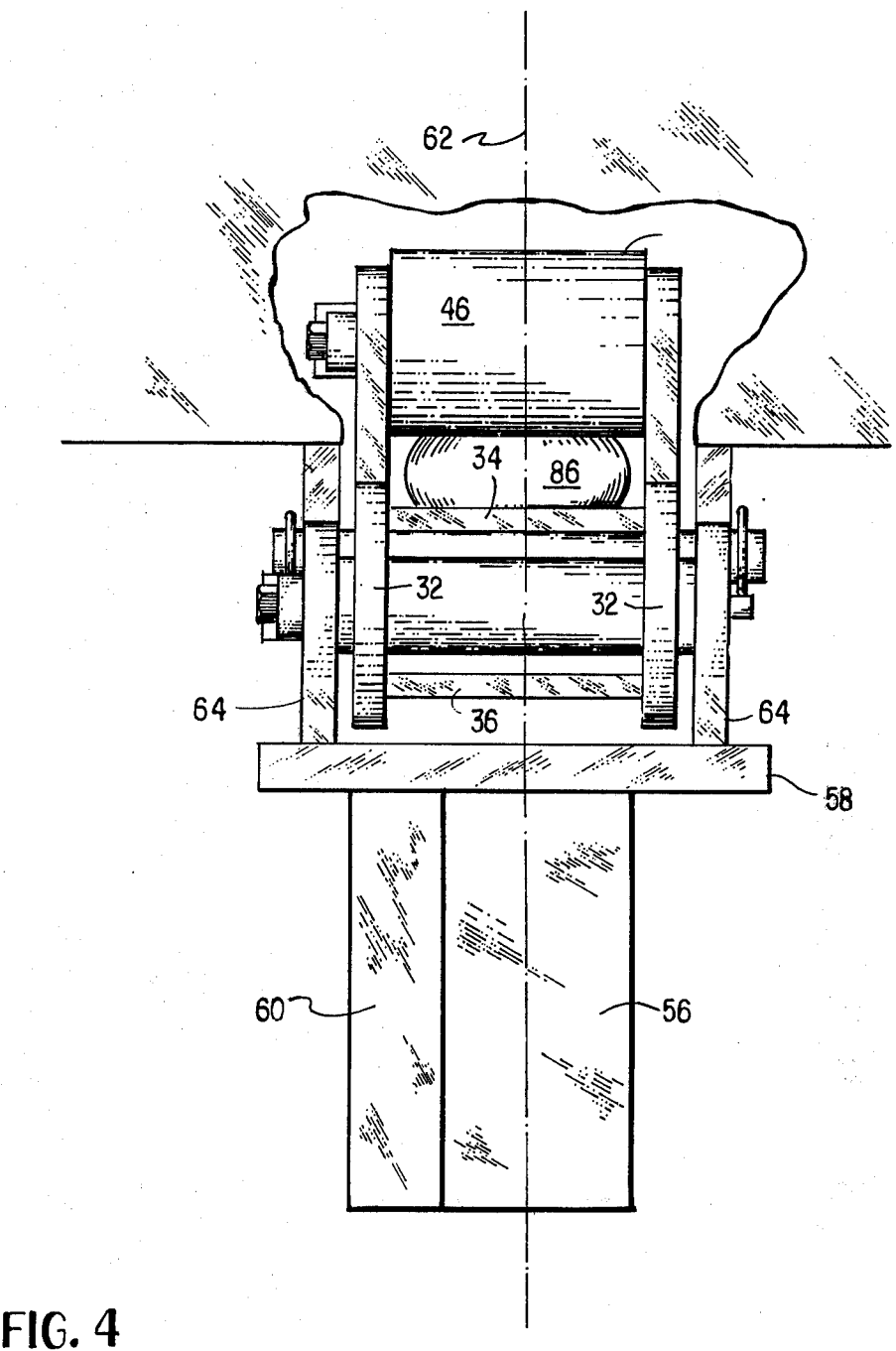
FIG. 4 is a broken rear elevation of the rail car coupling assembly in the position of FIG. 3.
Figure 5:
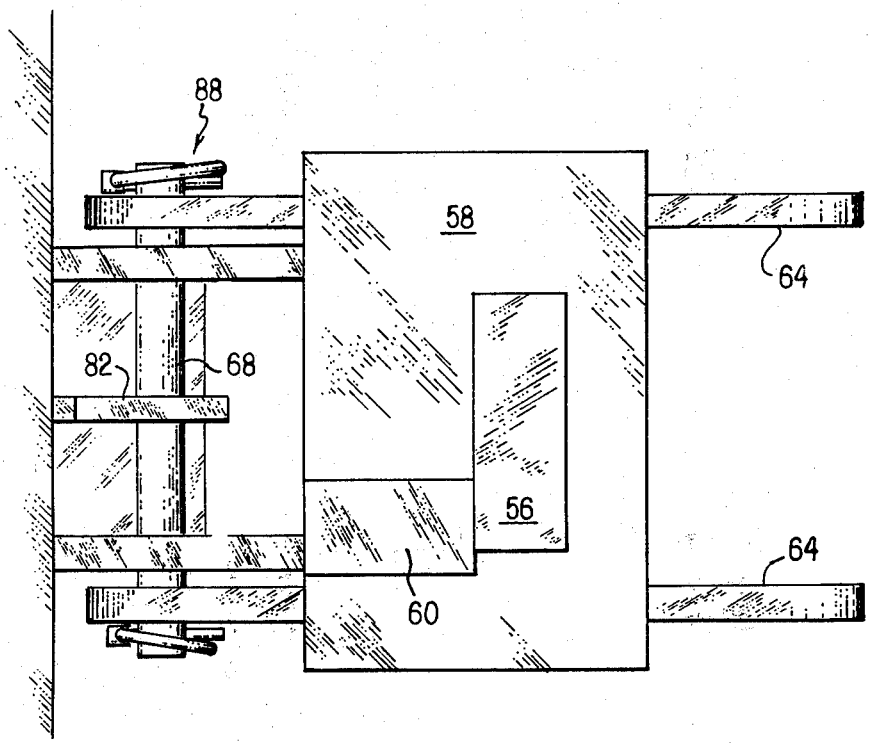
FIG. 5 is a partial top plan view of the rail car coupling assembly in the position of FIG. 2.

Rail car coupler 42 may be of any desired configuration to effectively mate with a corresponding coupling element 52 of conventional design carried by the rail car 54. To this end, the tractor mounted rail car coupler 42 may conveniently comprise a generally vertical plate 56 secured, as by welding or the like, to a generally horizontal plate 58 and an offset wedge shaped web 60. Since conventional rail car couplings are somewhat offset from the rail car centerline, the vertical coupling element plate 56 is correspondingly offset from the tractor centerline 62 as illustrated in FIG. 4. Since the trailer mounted coupler 42 does not normally undergo movement during a coupling operation the design of the same is such that the rail car coupling 52 with which it mates will operate in conventional fashion. The web 60 acts to rigidify the plates 56, 58 and may protrude through the offset opening in conventional rail car mounted coupling 52 to lend lateral stability to the coupled junction. Horizontal plate 58 is welded or otherwise secured to spaced side plates 64 containing central apertures 66 through which pivot pin 44 extends.

Positionment of the rail car coupling assembly 28 in the rail car coupling mode of FIGS. 1 and 2 is effected by lowering boom assembly 22 to the position of FIG. 2 and inserting locking pin 68 through aligned apertures 70 and 72 formed in coupling element side plates 64 and the bell crank assembly 30, respectively, as best understood from the exploded view in FIG. 6. The rail car coupler 42 is thus positioned within the path of coupling movement 74 (FIG. 2) which would be traversed by vehicle 10 during a coupling operation with either a trailer or rail car. When undergoing a coupling operation with a trailer (FIG. 3 position) the path of coupling movement 74 includes inclined frame structure 76 and terminates at fifth wheel 20 while the path of rail coupling movement terminates at rail car coupler 42 due to the fact that the same is positioned within such path of movement as shown in FIG. 2.

In order to effect a fractional weight transfer from the coupled rail car 54 to the rear driving axle of vehicle 10, rams 26, following the coupling operation, are further retracted from the position of FIGS. 1 and 2 resulting in counterclockwise movement of bell crank assembly 30 from the position of FIG. 2 and consequent weight transfer from the rail car to vehicle 10 via the bell crank assembly, pivot pin 38 and fifth wheel boom assembly 22. The purpose, of course, is to apply sufficient loading to the rear wheels 18 to provide traction for moving the rail car 54. The reason for such weight transfer requirement will be readily apparent upon consideration of the relative weights of the vehicles involved. Exemplary is a single drive axle spotter trailer manufactured by the assignee of the present invention having a total weight on the drive axle on the order of 5,500 pounds which is insufficient to provide the necessary loading to pull a loaded rail car which may have a gross weight on the order of 200,000 pounds.

In order to convert from the rail car coupling mode of FIG. 2 to the trailer coupling mode of FIG. 3; rams 26 are extended, locking pin 68 is removed, coupler 42 is rotated about pivot pin 44 to the position of FIG. 3 and pin 68 is reinserted through aligned apertures 78, 80 in spaced side plates 64 and bell crank assembly 30, respectively, as best illustrated in FIGS. 3 and 6.

Where vehicle 10 is undergoing extensive usage in the trailer coupling mode it may be desirable to immobilize the rail car coupling assembly 28 and for this purpose, a downwardly extending bracket 82 having a pin receiving opening 84 may be provided at the aft end of frame 14. In such event, boom assembly 22 is appropriately lowered from the position of FIG. 3 to permit insertion of locking pin 68 through all of aligned apertures 78, 80, 84 with such positionment moving resilient bumper 86 on the bell crank assembly into compressive engagement with vehicle frame 14. Each of pivot pins 38, 44 and 47 are retained by suitable pin retainer assemblies 88.

Coupling in the trailer mode is effected in conventional fashion with coupler 42 positioned outside the path of coupling travel 74 in either the position of FIG. 3 or the position last described where pin 68 extends through bracket opening 84.

Coupling in the rail car coupling mode is effected by positioning the assembly as in FIGS. 1 and 2, opening of the rail car coupling 52 and positioning vehicle 10 astride the rail tracks. Vehicle 10 is then backed toward rail car 54 with coupling 42 positioned in the path of coupling movement 78 until the same is forceably driven into rail car coupling 52 which, in accordance with conventional design, will close upon coupler 42 to effect the coupling union. When the vehicle 10 is of the relatively light weight type described above, it will be necessary to effect a partial weight transfer to the driving wheels by retracting rams 26 as previously described.

I claim:

1. A convertible trailer/rail car traction unit, comprising; a self propelled vehicle supporting a fifth wheel and rail car coupler in tandem for conjoint movement with said vehicle along a path of coupling movement; and means mounting one of said fifth wheel and rail car coupler for movement relative to said vehicle into and out of said path of coupling movement.

2. The traction unit of claim 1 wherein said means includes pivot means carried by said vehicle outboard of said fifth wheel; said rail car coupler being mounted on said pivot means; and locking means for selectively positioning said rail car coupler clear of and in intersecting relation to said path of coupling movement.

3. The traction unit of claim 2 including a vertically movable, power operated fifth wheel boom assembly supporting said fifth wheel; a rail car coupler assembly mounting said pivot means and rail car coupler adjacent one end thereof; and means mounting said rail car coupler assembly on said vehicle for vertical movement of said rail car coupler as a function of vertical movement of said fifth wheel boom assembly.

4. The traction unit of claim 3 wherein said rail car coupling assembly includes a first class lever having the other end thereof in immediate underlying juxtaposition to the outboard end of said fifth wheel boom assembly whereby powered downward movement of the outboard end of said boom assembly elevates said rail car coupler for positioning the same and effecting weight transfer from a coupled rail car to said traction unit.

5. The traction unit of claim 1 having driving wheels adjacent said rail car coupler; and weight transfer means, including said rail car coupler mounting means, for transferring a fraction of the weight of a coupled rail car to said driving wheels.

* * * * *